United States Patent [19]

Weems et al.

[11] 3,844,885

[45] Oct. 29, 1974

[54] INSULATION AND COOLING SYSTEM FOR A NUCLEAR REACTOR CONDENSER COMPARTMENT

[75] Inventors: Sterling J. Weems, Chevy Chase, Md.; H. William McCurdy, Vienna; John W. Johnson, Arlington, both of Va.

[73] Assignee: Westinghouse Electric Corporation, Pittsburgh, Pa.

[22] Filed: Apr. 29, 1969

[21] Appl. No.: 820,073

[52] U.S. Cl.......................... 176/37, 62/451, 176/38
[51] Int. Cl.............................................. G21c 13/00
[58] Field of Search................ 62/405, 451, 344 LS; 176/37, 38

[56] References Cited
UNITED STATES PATENTS

| | | |
|---|---|---|
| 2,008,269 | 7/1935 | Whittemore et al.............. 62/405 X |
| 2,517,686 | 8/1950 | Larkin .............................. 62/405 X |
| 3,127,755 | 4/1964 | Hemery ............................ 62/405 X |
| 3,127,756 | 4/1964 | Field................................. 62/405 X |
| 3,224,500 | 12/1965 | Bennett............................. 62/405 X |
| 3,423,286 | 1/1969 | Weems et al. ....................... 176/37 |

*Primary Examiner*—Reuben Epstein
*Attorney, Agent, or Firm*—J. R. Campbell

[57] ABSTRACT

The condenser compartment of a reactor containment is so insulated and cooled that a large quantity of a fusible material, such as ice, can be maintained in a solid state within the compartment for long periods of time. Mass transfer of the material due to sublimation and frosting is minimized by the insulation and cooling system provided, thereby achieving long term storage of the material with a reasonable and economical cooling system.

11 Claims, 8 Drawing Figures

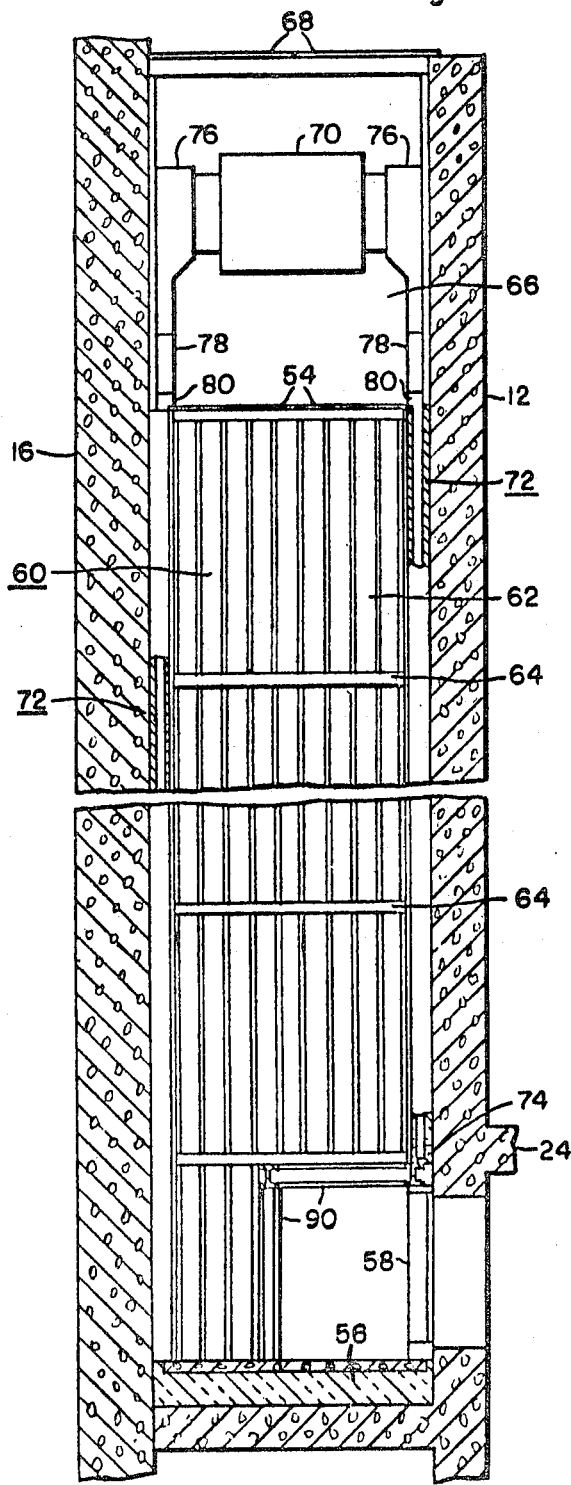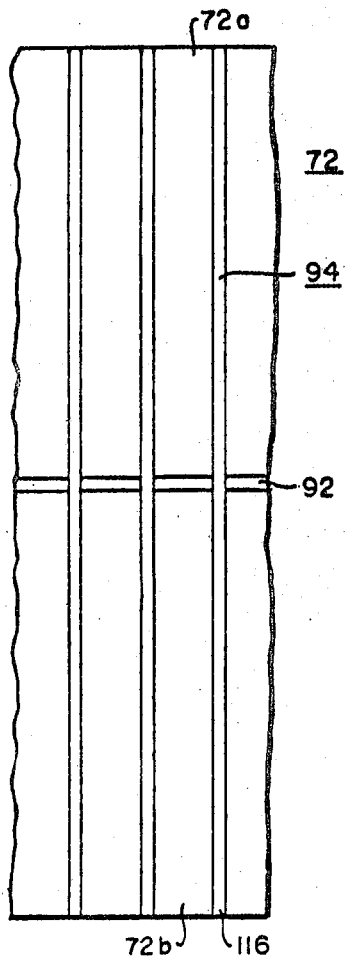

3,844,885

INSULATION AND COOLING SYSTEM FOR A NUCLEAR REACTOR CONDENSER COMPARTMENT

CROSS-REFERENCES TO RELATED APPLICATIONS

Certain features disclosed in this application are claimed in a copending application Ser. No. 40,530, filed Apr. 29, 1969, by W. G. Taft, R. Schiff and J. Iredale, now U.S. Pat. No. 3,095,372 and assigned to the Westinghouse Electric Corporation.

BACKGROUND OF THE INVENTION

This invention relates, generally, to pressure-suppressing arrangements for nuclear reactor power systems and, more particularly, to an insulation and cooling system for the condenser compartment of a reactor containment system of a condenser type, such as described in U.S. Pat. No. 3,423,286, issued Jan. 21, 1969 to S. J. Weems, J. A. Hinds and I. H. Mandil, and assigned to the Westinghouse Electric Corporation.

Basically, the reactor containment system of the condenser type involves the rapid absorption of the energy released from a reactor coolant system in the improbable event of a loss-of-coolant accident. The energy is absorbed by condensing the steam in a low temperature heat sink consisting of a suitable quantity of a fusible material in a solid state, such as ice, stored in a condenser which is essentially a cold storage compartment inside the reactor containment.

The storage of a large quantity of a low temperature fusible solid, such as ice, for long periods of time cannot be economically accomplished by conventional methods, such as described in U.S. Pat. No. 2,222,024, since these give rise to unacceptable temperature gradients and convection currents in the atmosphere in which the solid is stored. Such temperature gradients and convection currents result in mass transfer of the solid by sublimation and frosting.

An object of this invention is to ecomonically maintain a low temperature fusible solid in its original state and configurations in a condenser compartment for long periods of time without re-distribution or loss. This is accomplished by reducing the thermal gradients and in turn the air or other storage atmosphere convection currents to which the solid material is exposed, thereby minimizing the mass transfer of the material by sublimation.

Other objects of the invention will be explained fully hereinafter or will be apparent to those skilled in the art.

SUMMARY OF THE INVENTION

In accordance with one embodiment of the invention, the vertical walls of a generally annular condenser compartment defined between spaced inner and outer cylindrical walls of a reactor containment are lined on the inside with insulated duct panels through which a refrigerated fluid, such as air, is circulated. Each panel is an integral duct unit divided into downflow and upflow channels, with crossflow means at the bottom. The refrigerated air is kept separate from the air in the cold storage room so as not to affect the humidity within the cold storage room in order to avoid mass transfer of ice from the cold storage room to the refrigeration system. Thermal insulation and vapor barriers are provided at both sides of the flow channels of the panels to minimize heat and moisture gain and to reduce temperature gradients during operation of the system.

BRIEF DESCRIPTION OF THE DRAWINGS

For a better understanding of the nature and objects of the invention, reference may be had to the following detailed description, taken in conjunction with the accompanying drawings, in which:

FIG. 3 is an enlarged view, in vertical section, of the condenser portion of the containment shown in FIG. 1;

FIG. 5 is a view, in elevation, of part of the insulated duct panels utilized in the condenser;

DESCRIPTION OF PREFERRED EMBODIMENT

Figure 1:
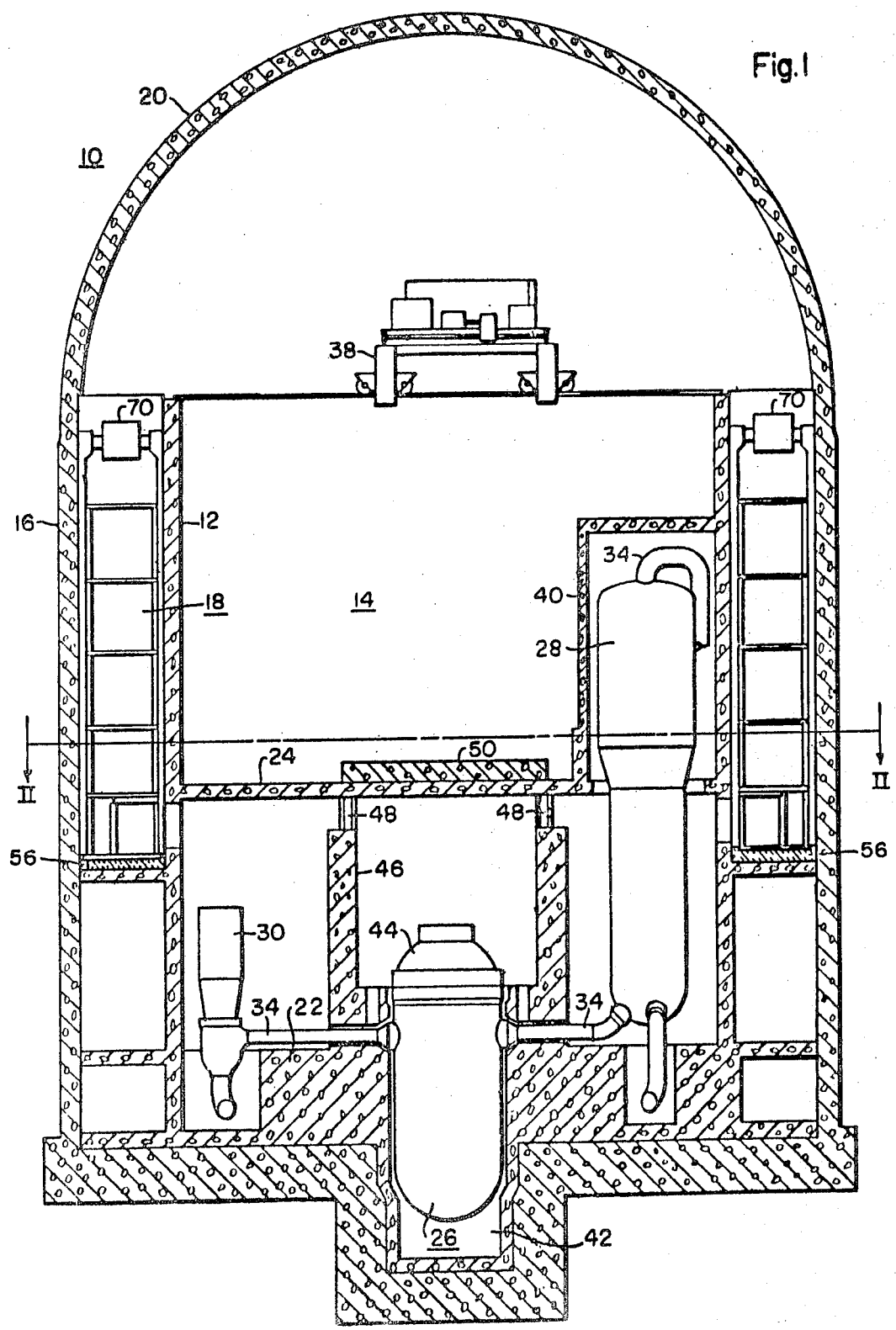
FIG. 1 is a vertical sectional view of a nuclear reactor containment having a condenser insulation and cooling system embodying principal features of the invention.
Figure 2:
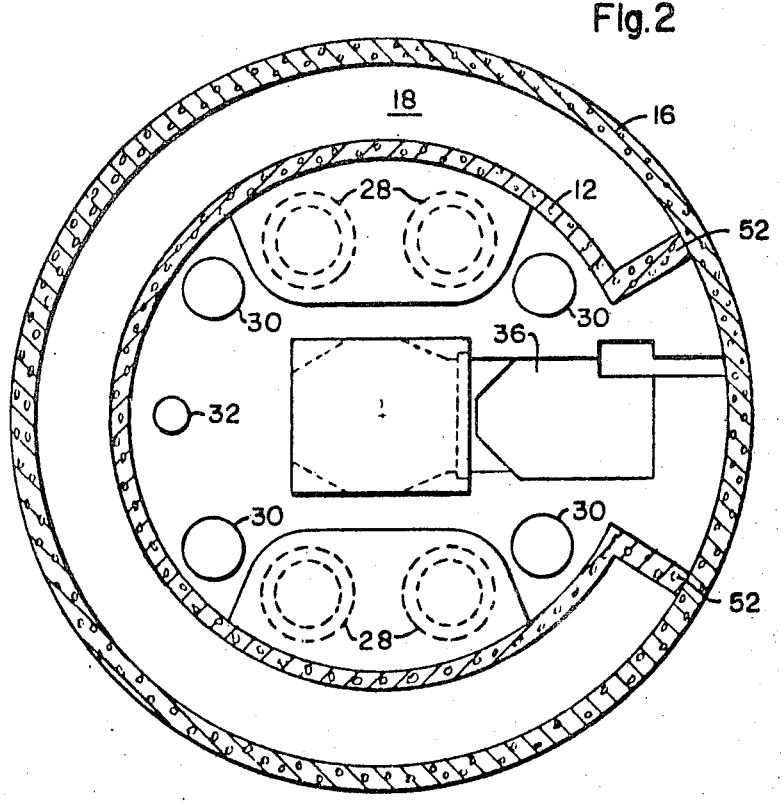
FIG. 2 is a sectional view, taken along the line II—II in FIG. 1.

Referring to the drawings, particularly to FIGS. 1 and 2, a reactor containment structure 10 shown therein comprises an inner vertical generally cylindrical wall 12 defining a reactor compartment 14, an outer vertical generally cylindrical wall 16 spaced from the inner wall 12 to define a generally annular condenser compartment 18 between the walls 12 and 16, a generally hemispherical head 20 supported by the outer wall 16, and a horizontal floor 22. The containment structure is preferably formed from concrete.

As shown, the reactor compartment 14 is divided into upper and lower portions separated by an operating deck 24. The lower compartment completely encloses the reactor coolant system equipment including a reactor vessel 26, steam generators 28, reactor coolant pumps 30, a pressurizer 32, shown in FIG. 2, and connecting piping 34. The upper compartment or portion contains a refueling canal 36 shown in FIG. 2, a crane 38 which is supported by the inner or crane wall 12, and additional refueling equipment (not shown). The steam generators 28 and the pressurizer 32 are enclosed by an extension 40 of the operating deck 24. The reactor vessel 26 is disposed in a well or sump 42 in the floor 22. The reactor vessel head 44 is enclosed by a primary shield 46 which is vented at 48. The vessel head enclosure is enclosed at the top by a removable concrete slab 50 which functions as a missile shield. The operation of the reactor power equipment is well known in the art and will not be described in this application.

As shown more clearly in FIG. 2, the condenser compartment 18 is in the form of a completely enclosed generally annular compartment which is located radially between inner wall 12 and outer wall 16, and in elevation, is generally above the operating deck 24. The condenser compartment 18 does not extend entirely around the containment structure, but does extend through an arc of approximately 300° as shown in FIG. 2. Thus, the ends of the condenser compartment are enclosed by vertical end walls 52. The top of the condenser compartment is enclosed by horizontally hinged doors 54, and the bottom of the compartment is enclosed by an insulated floor 56 as shown more clearly in FIG. 3. Vertically hinged inlet doors 58 located below the operating deck 24 provide access into the condenser compartment from the reactor coolant system compartment. The condenser compartment 18 contains a quantity of fusible material 60, such as ice, in a solid state. The material has the property of melting at a temperature lower than the condensation temperature of the condensable portions of the reactor coolant fluid which may escape from the reactor coolant system. The fusible material 60 is supported in the condenser compartment 18 in the manner fully described in the aforesaid copending application. Briefly, the material is contained in cylindrical porous containers 62 which are retained in horizontally spaced relation by means of vertically spaced frames 64 as shown in FIG. 3.

As described in the aforesaid U.S. Pat. No. 3,423,286, in the event of a loss-of-coolant accident, the inlet doors 58 would open immediately due to the pressure rise in the lower compartment caused by the release of reactor coolant. This would allow the steam to flow from the lower compartment into the ice condenser. In turn, the door panels 54 at the top of the ice condenser would open and allow some of the air which was initially in the lower compartment and the ice condenser compartment to flow into a plenum chamber 66 and thence into the upper reactor compartment through doors 68 located at the top of the plenum 66. The ice condenser would very quickly begin to condense the steam, thereby limiting the peak pressure in the containment structure 10.

As explained hereinbefore, the storage of a large quantity of a low temperature fusible solid, such as ice, for long periods of time cannot be economically accomplished by conventional refrigeration and insulation systems. Prior systems give rise to unacceptable temperature gradients and convection of the atmosphere in which the solid is stored. Such temperature gradients and convection currents cause mass transfer of the solid by sublimation and frosting.

Established conventional methods of thermally insulating and cooling a cold storage compartment incorporate essentially separate insulation and cooling systems. The boundaries of the compartment are lined with suitable low conductivity material and cooling is provided by a refrigerant circulating in pipes within the compartment, or by circulating the compartment air over refrigerated coils. Such systems cause mass transfer of the solid material by sublimation and frosting since the refrigerated air is in direct contact with the solid material.

In order to minimize mass transfer of the solid material, such as ice, due to sublimation and frosting, the present system is provided in which air, or other suitable fluid, is circulated in a circuit which is closed and effectively sealed relative to the compartment to be cooled. The air, or other fluid, is cooled by passing over coils 70 located in the plenum 66 and forming part of a conventional refrigeration system.

As shown more clearly in FIG. 3, all of the vertical walls of the condenser compartment 18 are lined with vertically extending insulated duct panels 72. Each panel 72 is a prefabricated integral air duct unit divided into downflow and up-flow channels with a cross-flow header 74 at the bottom. Air is drawn from the plenum 66 through the refrigerator coils 70 by fan units 76 and forced into the downflow channels through manifolds 78 which extend around the upper ends of the panels 72. The air flows down through the downflow channels of each panel and returns through adjacent upflow channels of the panel. The returning air exhausts directly into the plenum 66 through openings 80.

In this manner the heat gain from the walls is absorbed directly by the refrigerated cooling air and none of this heat is required to flow through the ice containing portion of the condenser compartment. Sublimation of ice is thus minimized by minimizing heat flow through the ice containing portion of the condenser compartment because no sublimation can occur without heat flow.

Furthermore, since the refrigerated cooling air is not in direct contact with the ice, it does not absorb moisture from the ice, thereby reducing loss of ice by frosting of the refrigerated cooling coils 70.

Figure 4:
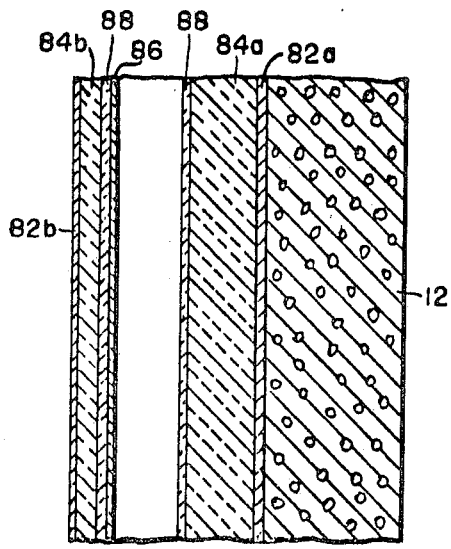
FIG. 4 is an enlarged fragmentary view in vertical section, taken along the line IV—IV in FIG. 6.

As shown more clearly in FIG. 4, each duct panel 72 essentially comprises a sandwich made up of the following layers, in cross section, starting with the outermost layer:

1. A sheet metal vapor barrier 82a is provided to minimize the ingress of moisture into the ice condenser compartment 18.

2. A relatively thick layer of thermal insulation 84a is provided to minimize total heat gain. The insulation 84 may be composed of Fiberglas, or other suitable insulating material.

Figure 6:
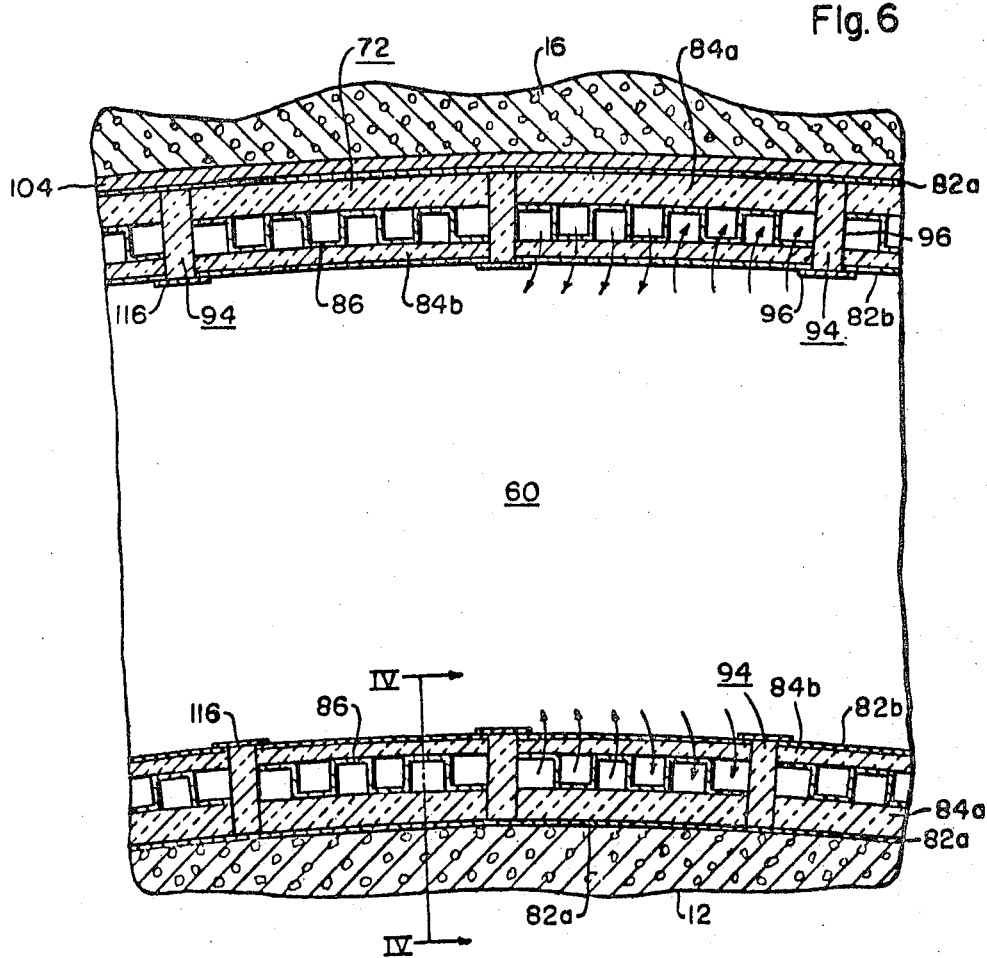
FIG. 6 is an enlarged view, in horizontal section, of a portion of the condenser and insulated duct panel structure.

3. A metal duct 86 is divided into downflow and upflow channels, as shown by arrows in FIG. 6, to permit the circulation of refrigerated air through the duct to absorb heat and moisture gain directly without causing this heat and moisture to flow through the condenser storage room itself. As previously explained, this refrigerated air is kept separate from the air in the condenser storage room so as not to affect the humidity within the storage room. This is done in order to avoid mass transfer of ice from the storage room to the refrigeration system. As also shown in FIG. 6, the channels in the metal duct 86 may be formed from rectangularly corrugated metal sheet. As shown in FIG. 4, alternate open sides of the corrugated duct are closed by means of flexible sheets 88 of insulating material to prevent the insulation 84 from entering the duct 86.

4. A somewhat thinner layer of thermal insulation 84b is provided between the refrigerated cooling air duct and the ice storage room itself to minimize heat transfer through the room due to inherent differences in refrigerated cooling air temperature from one wall area to another. It is desirable to minimize heat transfer through the ice storage room itself in order to prevent mass transfer of ice from one region of the room to another by sublimation.

5. Another metal vapor barrier 82b is provided between the thermal insulation layer described in item 4, above, and the ice storage room itself in order to minimize mass transfer of ice from the room to the refrigeration system.

As shown more clearly in FIGS. 3 and 5, the insulated cooling ducts for the walls of the ice compartment are installed as prefabricated panels 72. At the outer wall and end walls of the condenser compartment, the panels cover the full height of the ice compartment and are supported vertically by the floor 56. At the inner wall, the panels 72 terminate above the inlet doors 58, and their vertical load is carried by a lower support structure 90 which provides a lower void space to permit the doors 58 to open inwardly. For ease of handling during construction of the condenser for a power plant of a relatively large size, the panels 72 may be made in half-height sections 72a and 72b as shown in FIG. 5. A horizontal joint and vapor barrier seal 92 is provided at the joint between the sections 72a and 72b.

Figure 7:
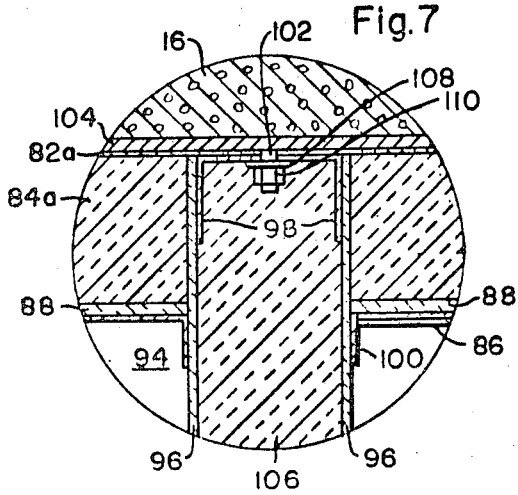
FIGS. 7 and 8 are enlarged detail views showing the manner of attaching the insulated duct panels to outer and inner walls, respectively, of the containment.
Figure 8:
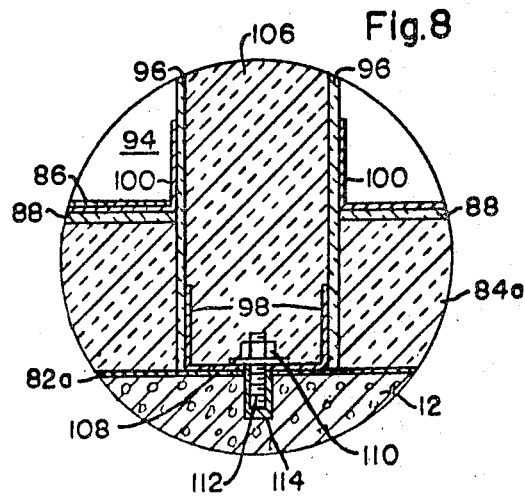

As also shown in FIG. 5, vertical joints and vapor barrier seals 94 are provided at the vertical joints between panels 72. As shown in FIGS. 7 and 8, an insulating board 96 is provided at each vertical edge of each panel 72. The boards 96 extend between the sheet metal vapor barriers 82a and 82b and are attached to the vapor barriers by vertically extending angle members 98 at corners of the panels. The boards 96 are also attached to the metal duct 86 by means of angle members 100. In this manner the panel unit is held together by the boards 96.

The panels 72 are attached to the containment wall 16 by means of threaded studs 102 secured to a metal containment liner 104 at the inner surface of the containment wall 16. Adjacent panels are spaced apart to permit insulating material 106, similar to the material 84, to be installed between the panels. The legs of the vertical angle members 98 which extend toward each other are attached to the studs 102 by means of spring washers 108 and nuts 110. Likewise, adjacent panels 72 are attached to the crane wall 12 by means of studs 112 secured in the wall 12 by means of inserts 114. The inwardly extending legs of angle members 98 on the two adjacent panels are attached to the studs 112 by means of spring washers 108 and nuts 110. As explained hereinbefore, the weight of the panels 72 is transmitted to the floor 56 at the outer wall of the ice condenser and to the support structure 90 at the inner wall. The insulating material 106 is retained in the space between adjacent panels by means of sealing strips 116 attached to the inner metal vapor barrier 82b.

Under seismic loading conditions, the corrugated metal ducting distributes the lateral load from the ice condenser internals to the walls of the ice condenser compartment. The insulation material acts as a damped spring allowing some relative movement without excessive loading.

From the foregoing description it is apparent that the invention provides a practical insulation and cooling system for maintaining low temperatures in a cold storage room for long term storage of ice, or other fusible material, so that mass transfer of the ice by sublimation and frosting is limited to desirably low values. The insulation and cooling system is particularly suitable for the condenser compartment of a nuclear reactor containment structure.

Since numerous changes may be made in the above described construction and different embodiments of the invention may be made without departing from the spirit and scope thereof, it is intended that all subject matter contained in the foregoing description or shown in the accompanying drawings shall be interpreted as illustrative and not in a limiting sense.

We claim:

1. A containment for pressurized fluid-handling apparatus including a nuclear reactor having a coolant system from which a pressurized expansible fluid may escape, an inner vertical generally cylindrical wall defining a compartment for said reactor, an outer vertical generally cylindrical wall spaced from the inner wall to define a generally annular condenser compartment between said walls, means for supporting a quantity of fusible material in a solid state in the condenser compartment, said material having the property of melting at a temperature lower than the condensation temperature of the condensable portions of said escaping fluid, cooling means including refrigeration apparatus and separate fluid-conducting vertically extending insulated duct panels placed in side by side relationship lining the inside of the walls of the condenser compartment, each of said duct panels comprising an integral unit divided into downflow and upflow channels with cross-flow means interconnecting the bottom of said channels, and means for circulating a refrigerated cooling fluid from said apparatus through the channels in said panels and out of contact with said material to maintain said material in a solid state except when exposed to said escaping fluid.

2. The combination defined in claim 1, including a plenum located above and normally separated from the condenser compartment.

3. The combination defined in claim 2, including a distribution manifold in said plenum communicating with said downflow channels, and said upflow channels communicating with said plenum.

4. The combination defined in claim 3, wherein said refrigeration apparatus and fluid circulation means are located in said plenum for cooling fluid drawn from the plenum and forcing it into the manifold for distribution through said duct panels.

5. The combination defined in claim 1, wherein each panel comprises in cross section, a metal vapor barrier, a layer of thermal insulation, a metal duct defining a channel, an additional layer of thermal insulation, and another metal vapor barrier.

6. The combination defined in claim 5, wherein the duct is formed from rectangularly corrugated metal sheet to provide vertical channels in the duct.

7. The combination defined in claim 6, including flexible sheets of insulating material at opposite sides of said duct to close alternate channels.

8. The combination defined in claim 6, including boards of insulating material extending between and attached to said metal barriers at vertical edges of the panel.

9. The combination defined in claim 5, including vertically extending angle members at corners of the panel, and means attaching said angle members to the walls of the condenser compartment.

10. The combination defined in claim 5, wherein the additional layer of insulation is disposed between the metal duct and the fusible material in the condenser compartment 11. The combination defined in claim 10, wherein the duct is divided into a plurality of vertical channels through which the cooling fluid is circulated.

* * * * *